(12) United States Patent
Xue et al.

(10) Patent No.: US 11,926,477 B2
(45) Date of Patent: Mar. 12, 2024

(54) SELF-SERVICE EXPRESS CABINET AND PACKAGE DELIVERY METHOD

(71) Applicant: Nuctech Company Limited, Beijing (CN)

(72) Inventors: Xin Xue, Beijing (CN); Zhongrong Yang, Beijing (CN); Qiwang Gao, Beijing (CN); Bo Tang, Beijing (CN)

(73) Assignee: Nuctech Company Limited, Beijing (CN)

( * ) Notice: Subject to any disclaimer, the term of this patent is extended or adjusted under 35 U.S.C. 154(b) by 272 days.

(21) Appl. No.: 15/929,514

(22) Filed: May 6, 2020

(65) Prior Publication Data

US 2020/0354148 A1 Nov. 12, 2020

(30) Foreign Application Priority Data

May 10, 2019 (CN) .......................... 201910389837.2

(51) Int. Cl.
*G06Q 20/18* (2012.01)
*B65G 1/06* (2006.01)
(Continued)

(52) U.S. Cl.
CPC ................. *B65G 1/12* (2013.01); *B65G 1/06* (2013.01); *B65G 15/00* (2013.01); *G01G 19/005* (2013.01);
(Continued)

(58) Field of Classification Search
None
See application file for complete search history.

(56) References Cited

U.S. PATENT DOCUMENTS 3,979,884 A * 9/1976 Russell .................. B65H 5/021
53/381.6
4,011,155 A * 3/1977 Feurstein ................ B65B 57/02
53/53
(Continued)

FOREIGN PATENT DOCUMENTS

CA 3083095 A1 * 5/2019 ........... B65B 11/025
CN 203025773 U 6/2013
(Continued)

OTHER PUBLICATIONS

"International Application Serial No. PCT/CN2020/072455, International Search Report and Written Opinion dated Mar. 27, 2020", 11 pgs.
(Continued)

*Primary Examiner* — William J Jacob
(74) *Attorney, Agent, or Firm* — Schwegman Lundberg & Woessner, P.A.

(57) ABSTRACT

The embodiments of the present disclosure disclose a self-service express cabinet and a package delivery method. The self-service express cabinet may include: a cabinet body including a sending window and a chamber, wherein the sending window may be connected with the chamber, and the sending window may be disposed on a surface of the cabinet body; a human-machine interaction device disposed on the cabinet body for information interaction with a user; an inspection device disposed in the chamber and capable of performing security inspection on a package dropped into the chamber for delivery, wherein the inspection device may have a receiving end and an output end, and at least part of the receiving end may be located within a scope of a forward projection of the sending window; and at least one storage component disposed in the chamber and corresponding to the output end.

17 Claims, 9 Drawing Sheets

(51) Int. Cl.
*B65G 1/12* (2006.01)
*B65G 15/00* (2006.01)
*G01G 19/00* (2006.01)
*G06K 1/12* (2006.01)
*G06K 7/10* (2006.01)
*G06K 7/14* (2006.01)
*G06N 5/04* (2023.01)
*G06N 20/00* (2019.01)
*G06Q 10/08* (2023.01)
*G06Q 50/26* (2012.01)

(52) U.S. Cl.
CPC ......... *G06K 1/121* (2013.01); *G06K 7/10366* (2013.01); *G06K 7/1413* (2013.01); *G06N 5/04* (2013.01); *G06N 20/00* (2019.01); *G06Q 10/08* (2013.01); *G06Q 20/18* (2013.01); *G06Q 50/265* (2013.01); *B65G 2203/0258* (2013.01); *B65G 2203/042* (2013.01)

(56) References Cited

U.S. PATENT DOCUMENTS

| | | | | |
|---|---|---|---|---|
| 5,491,737 | A * | 2/1996 | Yarnall | H05K 13/0061 378/69 |
| 5,740,221 | A * | 4/1998 | Norman | G01N 23/04 378/57 |
| 10,210,474 | B2 * | 2/2019 | Robinson | G06Q 10/0838 |
| 10,332,061 | B2 * | 6/2019 | Hoffman | G16H 20/13 |
| 10,853,757 | B1 * | 12/2020 | Hill | G06Q 10/06398 |
| 2001/0032443 | A1 * | 10/2001 | Tiley | G06Q 20/12 53/476 |
| 2003/0038179 | A1 * | 2/2003 | Tsikos | G02B 27/095 235/454 |
| 2004/0133446 | A1 * | 7/2004 | Myrick | G06Q 10/0836 705/339 |
| 2006/0020366 | A1 * | 1/2006 | Bloom | G06Q 20/00 700/226 |
| 2018/0096175 | A1 * | 4/2018 | Schmeling | G06F 1/3206 |
| 2018/0147726 | A1 * | 5/2018 | Kobayashi | G06V 10/751 |
| 2018/0197139 | A1 * | 7/2018 | Hill | H04N 25/67 |
| 2019/0258995 | A1 * | 8/2019 | Crane | G06Q 10/0838 |
| 2019/0350398 | A1 * | 11/2019 | Raphael | A47G 29/141 |

FOREIGN PATENT DOCUMENTS

| | | |
|---|---|---|
| CN | 204650669 U | 9/2015 |
| CN | 105809834 A | 7/2016 |
| CN | 105809835 A | 7/2016 |
| CN | 107622369 A | 1/2018 |
| CN | 108447191 A | 8/2018 |
| CN | 106056784 B | 10/2018 |
| CN | 108898754 A | 11/2018 |
| CN | 208705997 U | 4/2019 |
| CN | 109712336 A | 5/2019 |
| CN | 110111504 A | 8/2019 |
| CN | 210129261 U | 3/2020 |
| JP | 2015-165387 A | 9/2015 |
| KR | 20090046743 A | 5/2009 |

OTHER PUBLICATIONS

"Chinese Application 201910389837.2, Chinese Office Action dated Aug. 10, 2023", (Aug. 10, 2023), 9 pgs.

* cited by examiner

SELF-SERVICE EXPRESS CABINET AND PACKAGE DELIVERY METHOD

CROSS-REFERENCE TO RELATED APPLICATION

This application is based on and claims priority to Chinese Patent Application No. 201910389837.2 filed on May 10, 2019, which is incorporated herein by reference in its entirety.

TECHNICAL FIELD

The present disclosure relates to the field of logistics and package delivery, and more particularly to a self-service express cabinet and a package delivery method.

BACKGROUND

With rapid development of express industry, sending and collecting of packages may be limited by time and distance of senders and recipients. Nowadays, people have higher and higher requirements on security of the packages, therefore it is increasingly necessary to perform security inspection on the packages.

At present, logistics companies may have security centers in large and medium sized transfer stations. However, due to a large number of the packages and lack of security personnel, processing of the packages may take a long time, which affects development of the express industry.

SUMMARY

Embodiments of the present disclosure provide a self-service express cabinet and a package delivery method. The self-service express cabinet may automatically perform security inspection on packages and improve package delivery efficiency.

In a first aspect, an embodiment of the present disclosure provides a self-service express cabinet, the self-service express cabinet may include: a cabinet body including a sending window and a chamber, wherein the sending window may be connected with the chamber, and the sending window may be disposed on a surface of the cabinet body; a human-machine interaction device disposed on the cabinet body for information interaction with a user; an inspection device disposed in the chamber and capable of performing security inspection on a package dropped into the chamber for delivery, wherein the inspection device may have a receiving end and an output end, and at least part of the receiving end may be located within a scope of a forward projection of the sending window; and at least one storage component disposed in the chamber and corresponding to the output end to receive the package passing through the inspection device.

In a second aspect, an embodiment of the present disclosure provides a package delivery method for a self-service express cabinet, the method may include: receiving a sending signal; outputting a feedback information label according to the sending signal, and controlling a sending window to open; receiving a closing signal of the sending window, and obtaining a scanned image based on the closing signal, wherein the scanned image may be an image of a package affixed with the feedback information label captured by an inspection device; and determining based on the scanned image that the package passes security inspection and sending package information corresponding to the feedback information label.

BRIEF DESCRIPTION OF THE DRAWINGS

The drawings used in the embodiments of the present disclosure will be briefly introduced below. Those skilled in the art will be able to obtain additional drawings in accordance with these drawings without any creative work.

REFERENCE NUMBER

Figure 1:
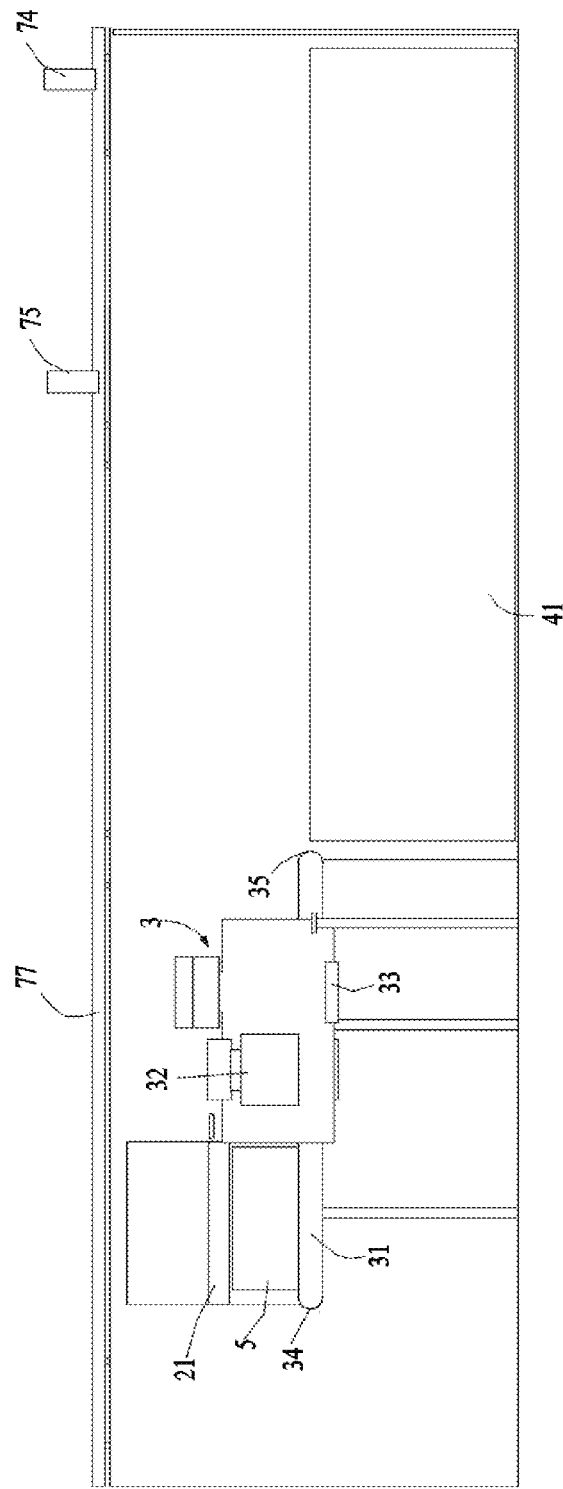
FIG. 1 is a cross-sectional view of a self-service express cabinet according to an embodiment of the present disclosure.

Wherein: 1—human-machine interaction device; 2—cabinet body; 21—sending window; 22—collecting window; 23—first abnormal package window; 24—first abnormal package channel; 25—second abnormal package window; 26—package compartment; 3—inspection device; 31—conveying component; 32—ray component; 33—weighing component; 34—receiving end; 35—output end; 4—package conveying device; 41—storage component; 42—conveying track; 43—bracket; 44—foldable bracket; 441—telescopic unit; 45—lifting device; 5—package; 51—abnormal package; 6—temporary storage unit; 61—storage compartment; 71—lighting indication unit; 72—video monitor unit; 73—display unit; 74—lightning arrester; 75—signal antenna component; 76—packaging material storage unit; 77—canopy.

DETAILED DESCRIPTION

Various aspects of features and exemplary embodiments of the present disclosure will be described in detail below. The present disclosure will be provided in further detail below in conjunction with accompanying drawings and embodiments in order to make objects, technical solutions and advantages of the present disclosure to be more clearly understood. It is to be appreciated that the specific embodiments described herein are to be construed to illustrate the present disclosure but not to limit the present disclosure. In addition, the components in the drawings are not necessarily drawn to scale. For example, the dimensions of some structural elements or regions in the drawings may be enlarged with respect to other structural elements or regions to help the understanding of the embodiments of the present disclosure.

The direction appearing in the following description are all directions shown in the drawings, and do not limit the specific structure of the embodiments of the present disclosure. In the description of the present disclosure, it should be further noted that, unless otherwise specified and limited, the terms "mount", "link" and "connect" should be understood in a broad sense, for example, it may be a fixed connection, a detachable connection, or an integrated connection, either directly or indirectly. Those of ordinary skill in the art can understand the specific meanings of the above terms in the present disclosure according to the specific situation.

Moreover, the term "comprise", "include", "have" or any other variant thereof is intended to encompass a non-exclusive inclusion, such that a structure or component that includes a series of elements includes not only these elements but also other elements that are not explicitly listed or other elements that are inherent to such a structure or component. In the absence of more restrictions, elements defined by the statement "includes . . . " do not preclude the presence of additional identical elements in the article or device that includes the elements. It will be apparent to those skilled in the art that the present disclosure may be practiced without some of these specific details. The following description of the embodiments is merely intended to provide a better understanding of the present disclosure by illustrating examples of the present disclosure.

The features and exemplary embodiments of various aspects of the present disclosure will be described in detail below. In addition, the features, structures, or characteristics described hereinafter may be combined in any suitable manner in one or more embodiments.

Figure 2:
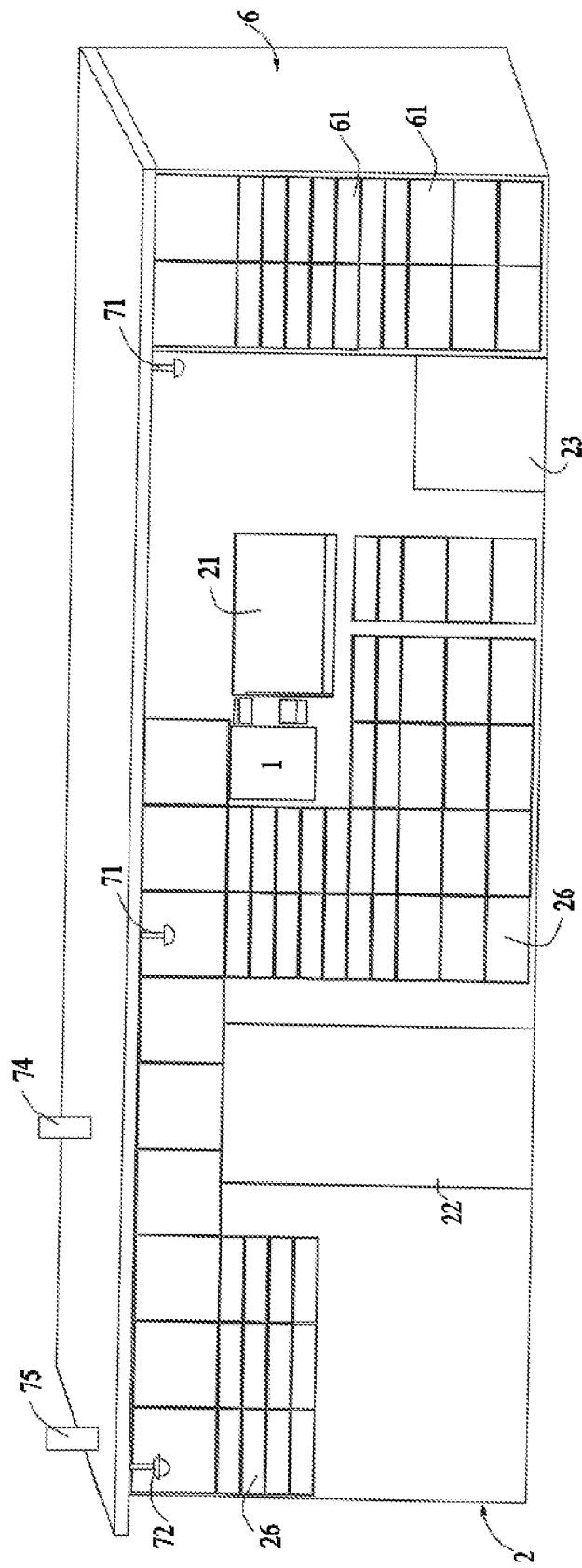
FIG. 2 is an overall structure diagram of a self-service express cabinet according to a first embodiment of the present disclosure.
Figure 3:
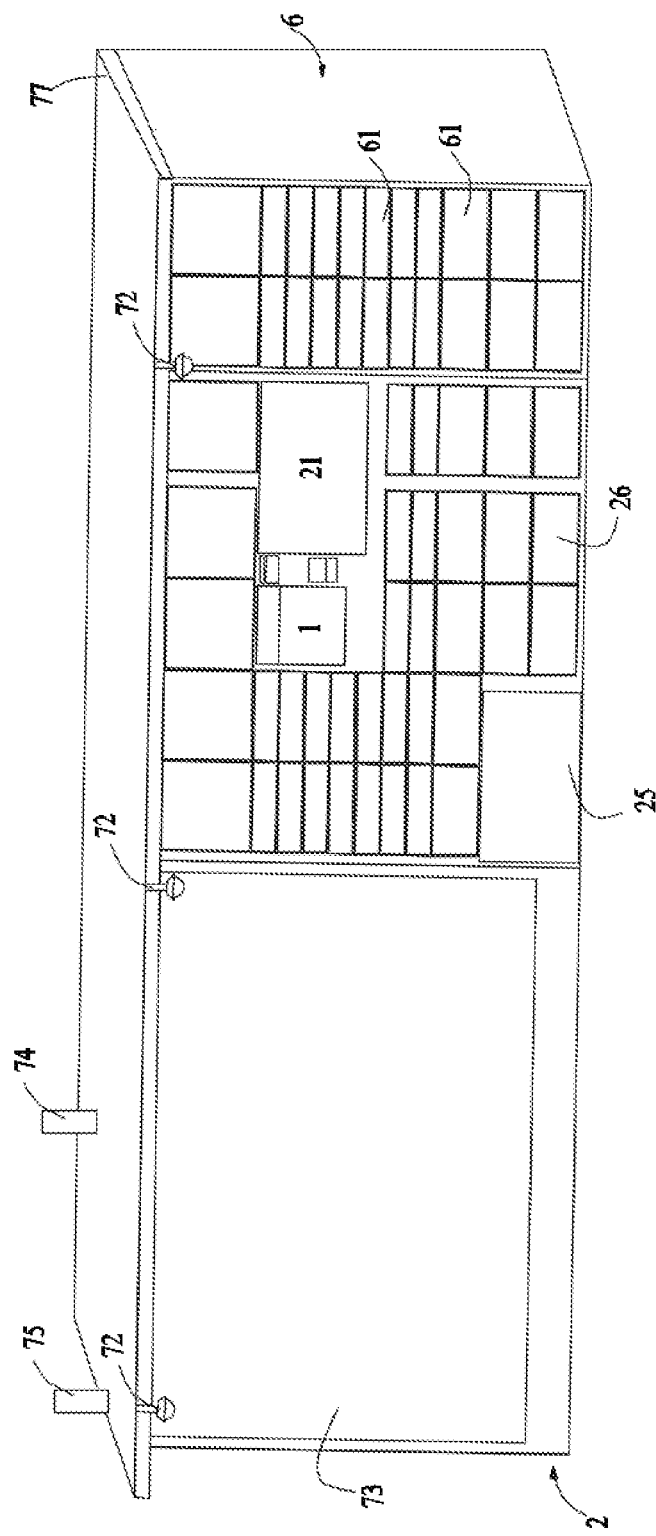
FIG. 3 is an overall structure diagram of a self-service express cabinet according to a second embodiment of the present disclosure.

Reference is made to FIG. 1 and FIG. 2, wherein FIG. 1 is a cross-sectional view of a self-service express cabinet according to an embodiment of the present disclosure; and FIG. 2 is an overall structure diagram of a self-service express cabinet according to a first embodiment of the present disclosure. According to the embodiment of the present disclosure, the self-service express cabinet may include a cabinet body 2, a human-machine interaction device 1, an inspection device 3 and at least one storage component 41. Wherein, the cabinet body may include a sending window 21 and a chamber, the sending window 21 may be connected with the chamber, and the sending window 21 may be disposed on a surface of the cabinet body 2; the human-machine interaction device 1 may be disposed on the cabinet body 2 for information interaction with a user; the inspection device 3 may be disposed in the chamber and capable of performing security inspection on a package 5 dropped into the chamber for delivery, the inspection device 3 may have a receiving end 34 and an output end 35, and at least part of the receiving end 34 may be located within a scope of a forward projection of the sending window 21, wherein the forward projection a projection perpendicular to a plane of the sending window; and the at least one storage component 41 may be disposed in the chamber and corresponding to the output end 35 to receive the package 5 passing through the inspection device 3.

The self-service express cabinet of the present disclosure may have the inspection device 3 disposed in the cabinet body 2, such that the self-service express cabinet may automatically deliver the package 5 and perform security inspection on the package 5. Accordingly, the security inspection on the large number of packages at the large security center may be diverted, and package delivery efficiency may be improved. Further, the receiving end 34 and the output end 35 of the inspection device 3 may correspond to the sending window 21 and the storage component 41 respectively. The package 5 passed through the inspection device 3 after the security inspection may be conveyed directly into the storage component 41, so as to prevent a user from exchanging and smuggling the package 5 which has passed the security inspection, which effectively guarantees the security of the packages.

In the embodiment of the present disclosure, the human-machine interaction device 1 may be disposed at a middle position on the front of the cabinet body 2, and may include any one or combination of a display screen, an encrypted keyboard, a face recognition module, a fingerprint recognition module, a radio frequency identification (RFID) card reader, a barcode printer and a speaker. Further, the human-machine interaction device 1 is not limited to the listed components, and may also include a display interface for user interaction, a card swipe slot, a coin slot, and a change outlet. The user may input package information through the display screen or a smart device according to screen prompts on the display screen and print a barcode sticker of a logistics order. Further, after the package 5 passes the inspection of the inspection device 3, according to the display screen and sound prompts of the speaker, the user may pay and obtain a logistics voucher, or get back the abnormal package 51. At the same time, a deliveryman may also collect the package through the collecting window according to prompts on the display screen.

According to an embodiment of the present disclosure, the sending window 21 may be disposed on one side of the cabinet body 2, and the sending window 21 may include a door and sliding components. A slider may be disposed on one of the door and the cabinet body 2, and a sliding rail may be disposed on the other. The door and the cabinet body may be relatively moved via the sliding components, thereby realizing opening or closing of the door.

According to another embodiment of the present disclosure, the sending window 21 may be disposed on one side of the cabinet body 2, and the sending window 21 may include a door. The door and the cabinet body 2 may be connected via a pivoting device, so that relative rotation between the door and the cabinet body 2 may be achieved, thereby realizing opening or closing of the door.

Further, an electronic lock may be provided between the door and the cabinet body 2. The electronic lock may be automatically locked or unlocked under control of the human-machine interaction device 1. Optionally, a position sensor for detecting the position of the door may also be provided between the door and the cabinet body 2. The position sensor may detect the relative position of the door relative to the cabinet body 2, so as to facilitate the human-machine interaction device 1 to control the position of the door in real-time. If the user does not close the door after operations are completed, the human-machine interaction device 1 may generate a prompt message through the display to prompt the user to perform the operations correctly.

According to an embodiment of the present disclosure, the structure of the collecting window 22 may be similar to that of the sending window 21, and both may include a door, an electronic lock, and the like. The deliveryman may open the door automatically or manually after being authenticated and authorized by the human-machine interaction device 1 or the smart device, and the deliveryman may take away the package 5 in the storage component 41 for delivery. Specifically, the deliveryman may move the package 5 to the region of the collecting window 22 by moving the storage component 41 and pick up the package, which effectively improve the efficiency of the deliveryman.

The door in the embodiments of the present disclosure may be an automatic door. The automatic door may be opened or closed automatically, so as to improve the efficiency and security of package delivery. It can be understood that the door in the embodiments of the present disclosure may also be a manual door, which is not limited in the present disclosure, as long as the door can be opened or closed to ensure the security of package delivery. It can be understood that, in the embodiment of the present disclosure, the structure of the collecting window 22 may be similar to that of the sending window 21, and details are not described herein again.

Referring to FIGS. 1 to 4, the self-service express cabinet may further include at least one temporary storage unit 6, and the temporary storage unit 6 may include multiple storage compartments 61 for storing items. The temporary storage unit 6 may include multiple storage compartments 61, which are evenly distributed on the express cabinet. Each corresponding storage compartment 61 may be provided with a door, an electronic lock, and a position sensor for detecting the position of the door. The structures of the door and the electronic lock may be similar to the structures of the door and the electronic lock of the sending window 21, and details are not described again. In addition, the temporary storage unit 6 may further include an auxiliary lighting device, which is convenient for the user to use at night. The deliveryman may automatically open the door of the storage compartment 61 after being authenticated and authorized by the human-machine interactive device 1 or a smart device, and place a package. Further, the human-machine interactive device 1 may automatically close the door and sends a delivery message to a recipient. The recipient may automatically open the door of the storage compartment 61 and collect the corresponding package after being authenticated and authorized by the human-machine interaction device 1 or a smart device.

According to an aspect of the present disclosure, the cabinet body 2 may further be disposed with any one or combination of a lighting indication unit 71, a video monitor unit 72, a display unit 73, a lightning arrester 74, a signal antenna component 75, a packaging material storage unit 76, and a canopy 77. The lighting indication unit 71 may include a lighting lamp and a status indicator provided on the upper part of the cabinet body 2, so that the user and the deliveryman may understand the operating status of the equipment at a distance. The video monitor unit 72 may be arranged on the upper part of cabinet body 2, and may record collecting process of the user or provide inspection video recording services. The display unit 73 may include a light box and an LED display screen, and may be used to display related contents or available capacity of the self-service express cabinet by using video images, so that the user may view latest information. The signal antenna component 75 may be used to provide a wireless communication connection, which facilitates the communication connection between the self-service express cabinet and an external equipment. The canopy 77 and the lightning arrester 74 may be respectively connected to top of the cabinet body to protect the self-service express cabinet, which further improving the security and service life of the self-service express cabinet.

Figure 4:
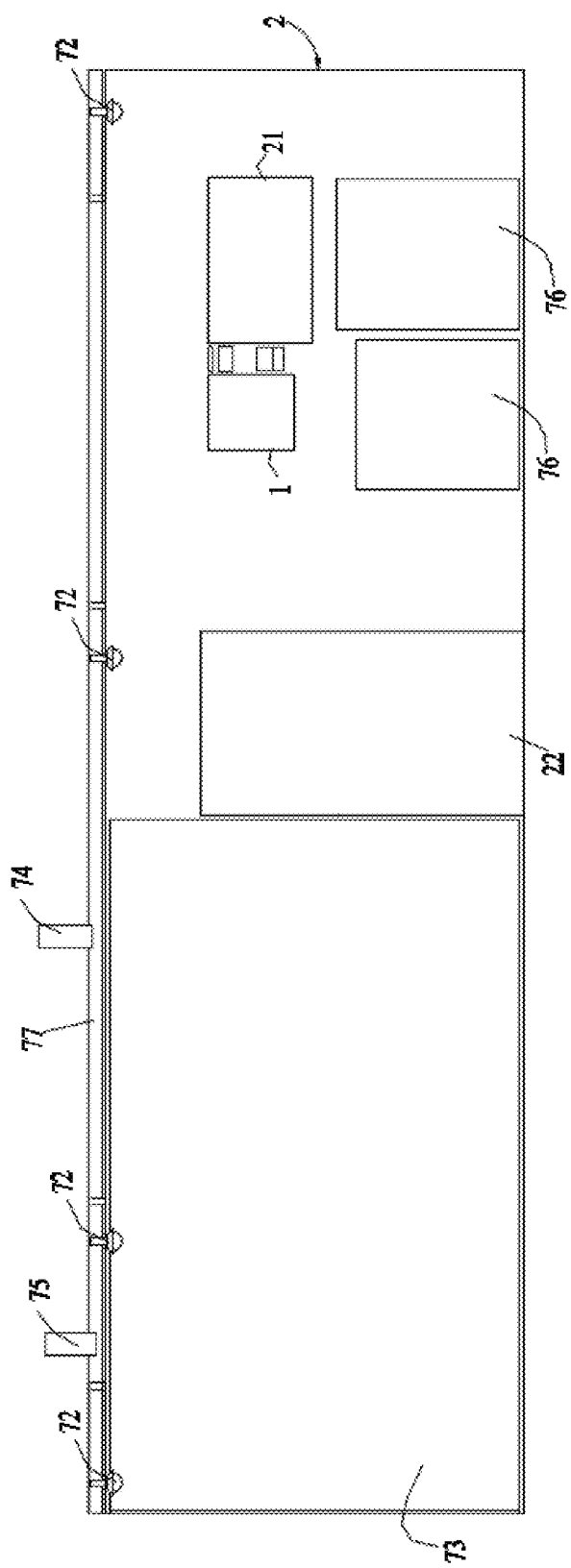
FIG. 4 an overall structure diagram of a self-service express cabinet according to a third embodiment of the present disclosure.

Referring further to FIG. 4. The packaging material storage unit 76 may be provided at a bottom of the cabinet body 2, and may be used to store materials for delivery such as packaging cartons and the like, so that the user may choose packaging materials by themselves when sending a package. It can be understood that the location of the packaging material storage unit 76 may also be set according to the needs of the user. When the user sends a package, after being authenticated and authorized by the human-machine interaction device 1 or a smart device, the user may select a corresponding packaging material and pay through prompts on the display screen of the human-machine interactive device 1. After the user successfully pays, the human-machine interactive device 1 may control the opening of the door of the packaging material storage unit 76, and the user may take the corresponding packaging material.

Referring to FIGS. 5 to 8. The inspection device 3 may include a conveying component 31, a ray component 32, a detector component (not shown in the figure), and a weighing component 33. The conveying component 31 may extend from the sending window 21 in a direction towards the package conveying device 4 for automatic transmission of the package 5, and the ray component 32 may emit a ray beam. Accordingly, the detector component may receive the ray beam passed through the package 5 and generate a detection signal to perform security inspection on the package 5. Optionally, the ray component 32 may be disposed above the conveying component 31, and the detector component may be disposed opposite the ray component 32, so that the ray beam emitted by the ray component 32 can pass through the package 5 and be more effectively received by the detector component. A weighing component 33 may be provided at a bottom of the inspection device 3 to detect a weight of the package 5 passing through the ray component 32. Optionally, the conveying component 31 may be a belt conveying component, and the belt conveying component may steadily convey the package 5. Further, the inspection device 3 may further include a housing. The housing may include a space and an opening connected with the space. The conveying component 31 may be disposed passing through the housing, and the ray component 32 may be disposed on top of the housing to perform security inspection on the package 5 passing through the inspection device 3.

The weighing component 33 may be arranged at a bottom of the conveying component 31, and the weighing component 33 may pre-store a weight of the conveying component 31. When the package 5 is placed on the conveying component 31, the weighing component 33 may measure a total weight of the conveying component 31 and the package 5. A weight of the package 5 may be the difference between the total weight measured by the weighing component 33 and the weight of the conveying component 31 pre-stored. It can be understood that the weighing component 33 may periodically measure the weight of the conveying component 31 and update the pre-stored data to accurately measure the weight of the package to be measured. By accurately measuring the weight of the package 5, a charge of the package 5 may be obtained more accurately, thereby effectively improving the accuracy of the self-courier cabinet.

The inspection device 3 may further include a volume sensor and an item status sensor disposed on the conveying component 31. The volume sensor may be used to measure a volume of the package 5, and the item status sensor may be used to detect the status of the package 5 on the conveying component 31. The user may place the package 5 on the conveying component 31 through the sending window 21, and the volume, the weight, and the security of the package 5 may be detected via the volume sensor and the item status sensor on the conveying component 31, respectively. When the volume, the weight and the security of the package 5 are qualified, the human-machine interaction device 1 may generate a delivery time and charge information of the package 5 for the user to choose and pay. The delivery time of the package 5 may be selected (e.g., regular or urgent), and different delivery time may correspond to a different corresponding charge information. The package 5 which is detected abnormal or not payed within a predetermined time will be reversely conveyed to the sending window 21 via the conveying component 31. The human-machine interaction device 1 may control the door of the sending window 21 to open and the user may retrieve the abnormal package 51. If the user does not retrieve the abnormal package 51 for a long time, the abnormal package 51 will be conveyed by the conveying component 31 to a specific storage component 41 on the package conveying device 4.

Further, in the embodiment of the present disclosure, the self-service express cabinet may include multiple storage components 41 and further include a package conveying device 4. The multiple storage components 41 may be disposed on the package conveying device 4, so that the package conveying device may conveying the package 5 along a fixed movement trajectory in the cabinet body 2. Optionally, a collecting window 22 may be further disposed on the surface of the cabinet body 2, and a forward projection of the collecting window may be located within a scope of the movement trajectory of the package 5. Further, multiple package compartments 26 may be provided on the cabinet body 2 for the user to store items or packages. The package compartments 26 may effectively improve the space utilization rate of the self-service express cabinet.

Figure 5:
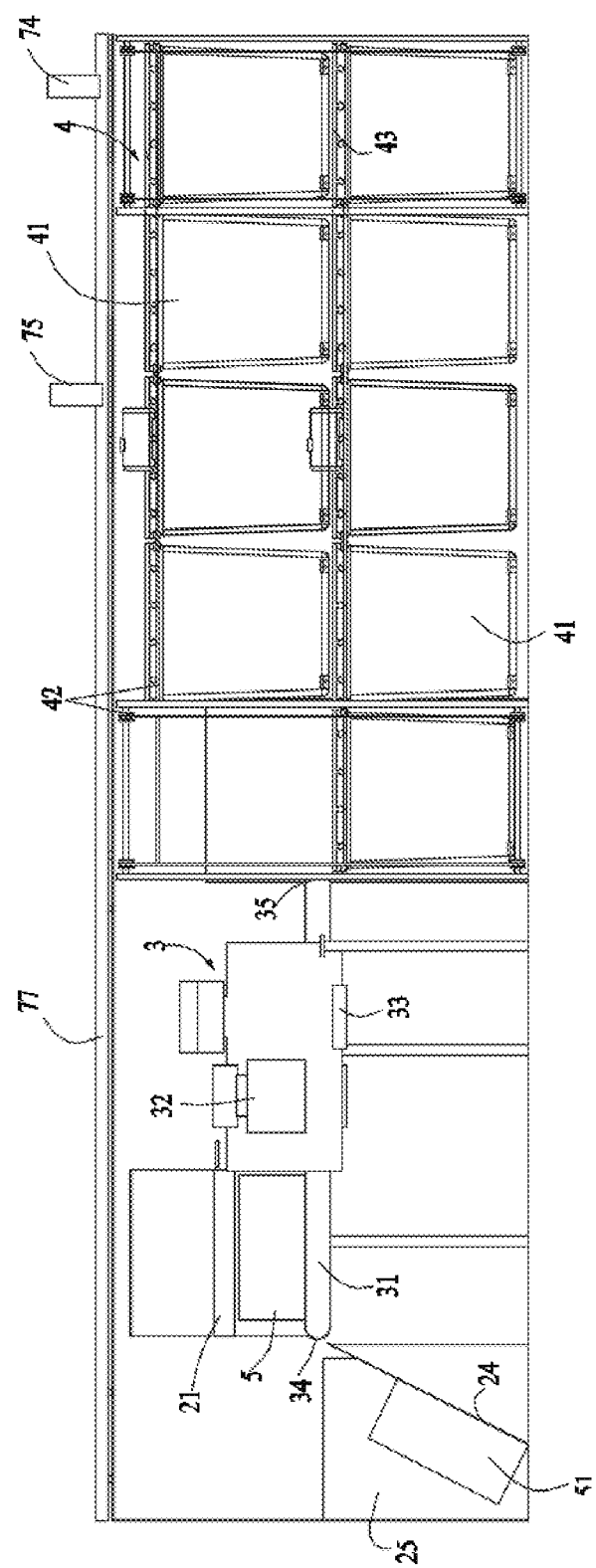
FIG. 5 is a cross-sectional view of the self-service express cabinet according to the first embodiment of the present disclosure.

According to an embodiment of the present disclosure, referring to FIG. 5, which is a cross-sectional view of the self-service express cabinet according to the first embodiment of the present disclosure. The package conveying device 4 may include a conveying track 42 and a bracket 43. The multiple storage components 41 may be disposed on the bracket 43. The bracket 43 may be disposed on the conveying track 42 and drive the storage components 41 to move along the conveying track 42. Therefore, the storage components 41 may drive the package 5 to move along a fixed movement trajectory in the cabinet body 2; wherein, in the embodiment of the present disclosure, the conveying track 42 may be a revolving track. The storage component 41 may also be provided with a first package identification and positioning device, which is used to detect the capacity within the storage component 41 and the position of the storage component 41. When the package 5 passing the inspection device 3, the package conveying device 4 may sequentially moves the regularly arranged storage components 41 to the output end 35 of the conveying component 31 (an end of the conveying component 31 away from the sending window 21), and the conveying component 31 may drop the package 5 into the storage component 41. If the first package identification and positioning device detects that the capacity of the storage component 41 is less than or equal to a preset value of a total capacity of the storage component 41, the storage component 41 may continue to wait the drop of the package 5, and the preset value may be 70%. If the first package identification and positioning device detects that the capacity of the storage component 41 is greater than the preset value of the total capacity of the storage component 41, a next storage component 41 may be moved by a driving mechanism to the output end 35 of the conveying component 31 and wait the drop of a next package 5. In the embodiment of the present disclosure, one or more storage components 41 of the multiple storage components 41 may be marked to store an abnormal package 51, so as to the abnormal package 51 or other abnormal package 51 that the user has not taken away for a long time.

In the embodiment of the present disclosure, the storage component 41 may correspond to the bracket 43. The storage component 41 may be a storage bag. The storage bag may be hung on the bracket 43. The bracket 43 may be disposed with multiple wheels that can travel along the conveying track 42. The bracket 43 may steadily move along the conveying track 42 via the multiple wheels, thereby driving the multiple storage bags hanging on the brackets 43 to move relatively in the cabinet body 2. Further, with the storage bag hanging on the bracket 43, a bottom end of the storage bag may be always kept downward to prevent the package in the storage bag from overflowing when the storage bag is moving along with the wheels, and the deliveryman may easily remove and replace the storage bag from the bracket 43. In this embodiment, the collecting window 22 may be arranged close to the sending window 21, which is convenient for the deliveryman to quickly understand the status of the package for delivery when collecting. The deliveryman may automatically or manually open the door after being authenticated and authorized by the human-machine interaction device 1 or the smart device when collecting, and may collect the goods in the delivery area. Further, the deliveryman may move the subsequent storage bags to the delivery area via a circular transport mechanism.

Figure 6:
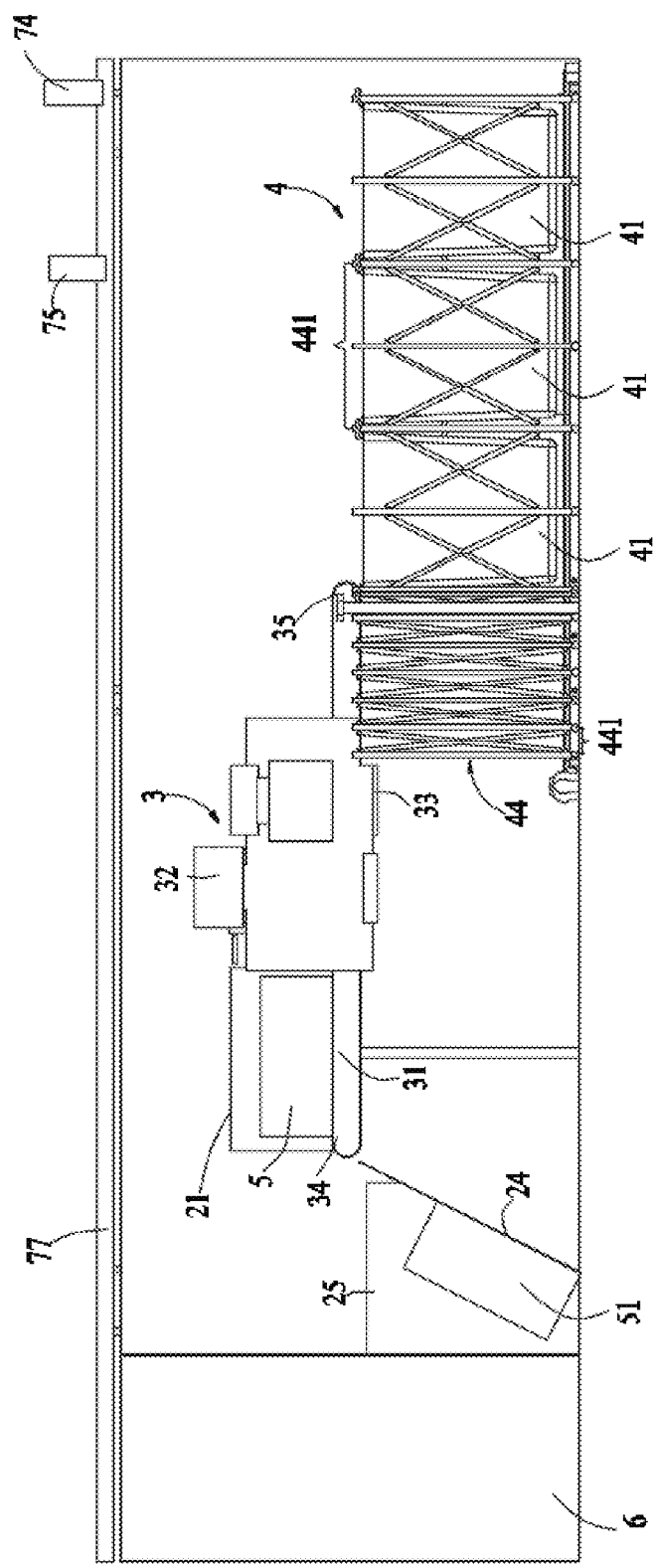
FIG. 6 is a cross-sectional view of the self-service express cabinet according to the second embodiment of the present disclosure.

According to another embodiment of the present disclosure, referring to FIG. 6, which is a cross-sectional view of the self-service express cabinet according to the second embodiment of the present disclosure. The package conveying device 4 may include a foldable bracket 44, a control component, and a second package identification and positioning device. The foldable bracket 44 may include multiple telescopic units 441 connected with each other, and the storage component 41 may be a telescopic storage component 41. Each of the telescopic units 441 may be disposed with at least one storage component 41, and the storage component 41 may perform synchronous telescopic movement along the horizontal direction in FIG. 6 with the telescopic unit 441. Optionally, the storage component 41 may be a storage bag. The foldable bracket 44 may be arranged below the conveying component 31. The control component may sequentially expand the interconnected telescopic units 441, and may push the storage component 41 fixed on the telescopic unit 441 to the output end 35 of the conveying component 31. The conveying component 31 may drop the package 5 into the storage module 41 located at the output end 35 of the conveying component 31. The second package identification and positioning device may detect the capacity of the storage component 41, and based on the capacity of the storage component 41 detected by the second package identification and positioning device, the human-machine interaction device 1 may instruct the storage component 41 to wait for the drop of the package 5, or instruct the control component to expand the foldable bracket 44 and push a next storage component 41 to move to the drop area.

In the embodiment of the present disclosure, one or more storage components 41 of the multiple storage components 41 may be marked to store an abnormal package 51, so as to the abnormal package 51 or other abnormal package 51 that the user has not taken away for a long time. In the embodiment of the present disclosure, the collecting window 22 may be arranged close to the sending window 21, which is convenient for the deliveryman to quickly understand the status of the package for delivery when collecting. The deliveryman may automatically or manually open the door after being authenticated and authorized by the human-machine interaction device 1 or the smart device when collecting, and may collecting the goods in the delivery area. Further, the deliveryman may control the control component to fold the foldable bracket 44 having the currently empty storage bag, and push a subsequent storage bag to move to the delivery area, so as to collect a next package.

Figure 7:
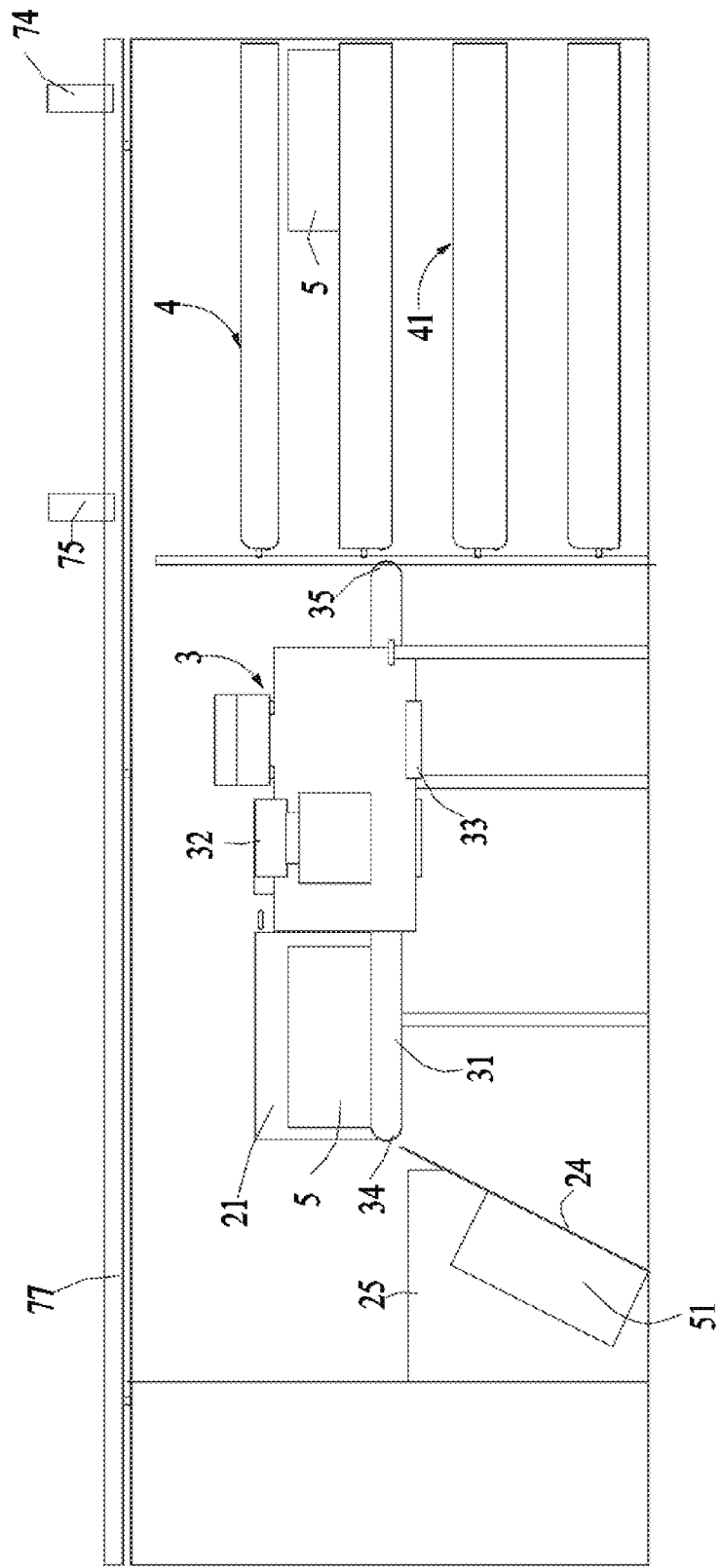
FIG. 7 is a cross-sectional view of the self-service express cabinet according to the third embodiment of the present disclosure.

According to another embodiment of the present disclosure, referring to FIG. 7, which is a cross-sectional view of the self-service express cabinet according to the third embodiment of the present disclosure. The multiple storage components 41 may be storage brackets reciprocating along a first direction (e.g., a vertical direction in FIG. 7). The multiple storage brackets may be sequentially disposed on the package conveying device 4 along the first direction; wherein the multiple storage components 41 may be arranged at different intervals along the first direction for storing the packages with different volumes, thereby improving the storage space utilization rate of the storage brackets and improving the storage efficiency of the packages. Optionally, the storage component 41 may include a conveying belt and a conveying shaft, and a baffle may be provided around of the conveying belt to protect the package dropped on the storage bracket, so as to prevent the package from falling or being damaged. The multiple storage components 41 may be provided on the package conveying device 4 via the conveying shaft, and the package conveying device 4 may further include a screw component or a cylinder component reciprocating along the first direction. Further, the multiple storage components 41 may reciprocate along the first direction via the screw component or the cylinder component, such that the multiple storage components 41 may sequentially connect to the output end 35 of the inspection device 3 in order to receive the package passing through the inspection device 3.

In a possible implementation of the first aspect, the self-service express cabinet may further include a first abnormal package window 23 and a first abnormal package channel 24, wherein the first abnormal package window 23 may be disposed on the cabinet body 2, and a forward projection of the first abnormal package window 23 may be located within a scope of the first abnormal package channel 24; the first abnormal package channel 24 may be disposed inside the cabinet body 2 and corresponding to the package conveying device 4. Optionally, the first abnormal package channel 24 may be disposed at the receiving end 34 of the conveying component 31 (the end of the conveying component 31 away from the sending window 21) to receive the abnormal package 51 detected by the inspection device 3. Further, the first abnormal package channel 24 may extend from the receiving end 34 of the inspection device 3 toward a bottom of the cabinet body 2. The abnormal package 51 detected by the inspection device 3 may be moved to a region of the first abnormal package window 23 through the first abnormal package channel 24.

The first abnormal package window 23 may include a door and an electronic lock, which are similar to the door and the electronic lock on the sending window 21, and will not be described in detail. When the inspection device 3 detects that the package is abnormal, the conveying component 31 of the inspection device 3 may move the package backward to the receiving end 34 of the conveying component 31 and pushes the abnormal package 51 into the first abnormal package channel 24. The abnormal package 51 may be moved along the first abnormal package channel 24 to the region of the first abnormal package window 23. At this time, the human-machine interaction device 1 may control the door of the first abnormal package window 23 to automatically open, and the user may collect the abnormal package 51 from the first abnormal express window 23.

Figure 8:
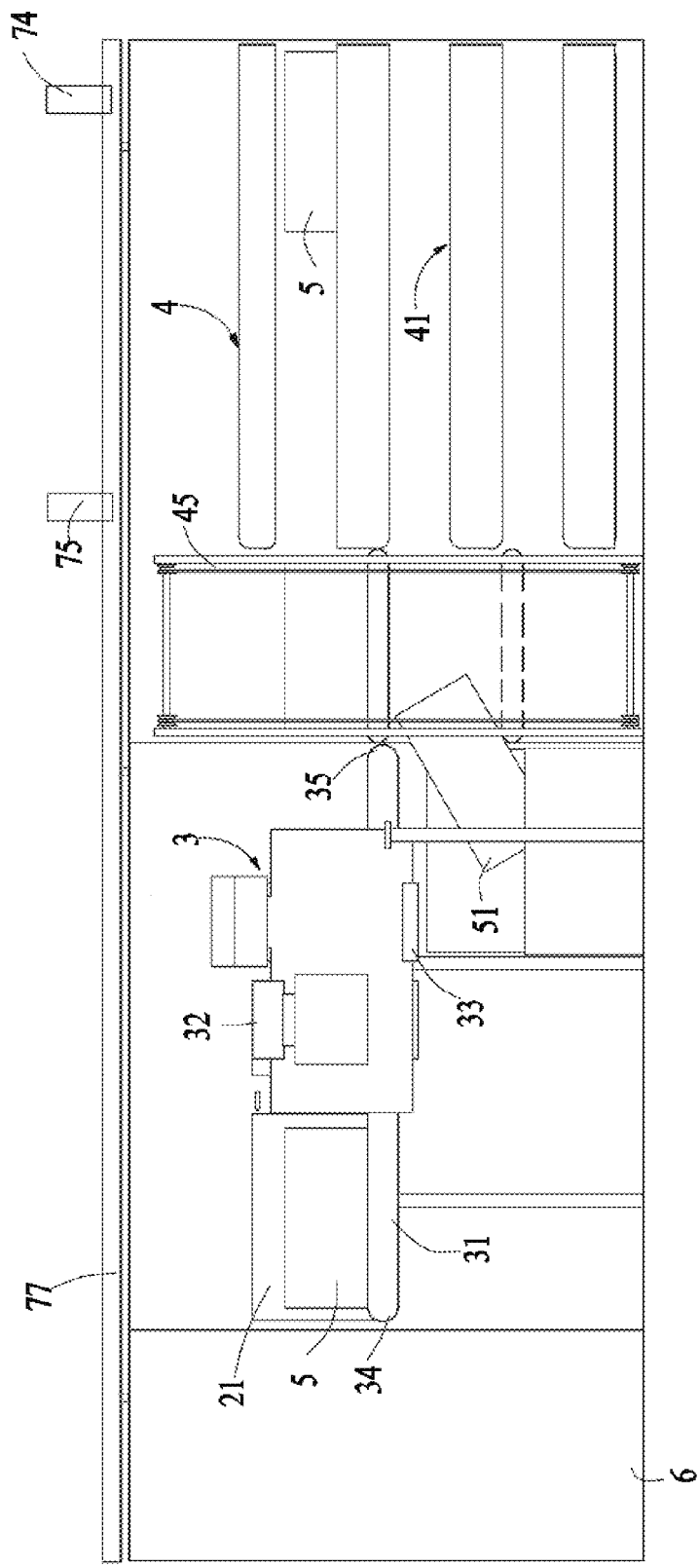
FIG. 8 is a cross-sectional view of a self-service express cabinet according to a fourth embodiment of the present disclosure.

Referring to FIG. 8. The package conveying device 4 may include a lifting device 45. The lifting device 45 may be disposed between the inspection device 3 and the storage components 41. The lifting device 45 may reciprocate in a first direction. Optionally, the lifting device 45 may include a belt conveyor. The multiple storage components 41 may be sequentially disposed on the package conveying device 4 along the first direction, and the multiple storage components 41 may be at different intervals along the first direction for storing the packages with different volumes, thereby improving the storage space utilization rate of the storage brackets and improving the storage efficiency of the packages. A baffle component may be provided around of the storage components 41 to prevent the package from falling or being damaged. Further, the cabinet body 2 may further be disposed with a second abnormal package window 25. The second abnormal package window 25 may be disposed corresponding to the storage components 41. The lifting device 45 may convey the abnormal package 51 to the second abnormal package window 25 by reciprocating along the first direction.

In the embodiment of the present disclosure, the qualified package and abnormal package 51 checked by the inspection device 3 may be both placed on the lifting device 45 via the conveying component 31 of the inspection device 3. The qualified package may be sequentially dropped into the corresponding storage module 41 by the lifting device 45 according to the volume of the package and the capacity of the storage component 41, and the storage module 41 may sequentially store the package. The abnormal package may be put into a designated storage component 41 by the belt conveyor of the lifting device 45, or the abnormal package may be put into the second abnormal package window 25 by the belt conveyor running reversely. Optionally, an abnormal package storage box may be disposed near the second abnormal package window 25. Further, the abnormal package storage box may be located in a scope of a forward projection of the second abnormal package window 25. The second abnormal package window 25 may be located below the sending window 21 and include components such as a door and an electronic lock. The deliveryman or user may automatically or manually open the door after being authenticated and authorized by the human-machine interaction device 1 or the smart device, and collect the goods from the delivery area.

When using the self-service express cabinet provided by the embodiment of the present disclosure for delivery packages, all the packages 5 may be detected by the inspection device 3, and the packages 5 that pass the security inspection and are payed normally will be directly dropped into the storage components 41 via the inspection device 3. The packages in the storage components 41 may only be collected by the authorized deliveryman through the collecting window 22, which effectively prevents the qualified packages from being exchanged, smuggled, and the like.

Figure 9:
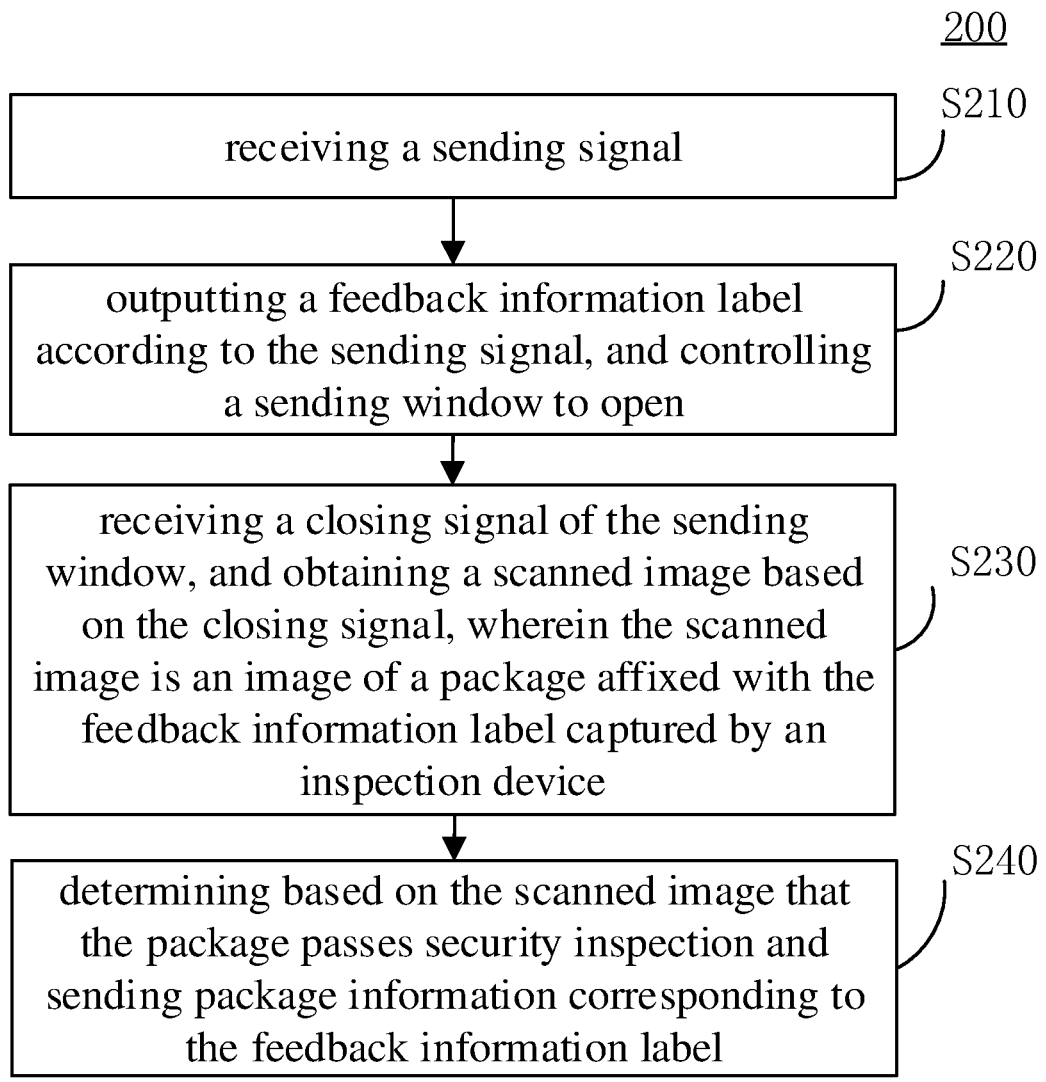
FIG. 9 illustrates a flowchart of a package delivery method according to an embodiment of the present disclosure.

According to another aspect of the present disclosure, a package delivery method 200 for the self-service express cabinet is provided. As shown in FIG. 9, the package delivery method 200 may include the following steps: S210, receiving a sending signal; S220, outputting a feedback information label according to the sending signal and controlling a sending window to open; S230, receiving a closing signal of the sending window, and obtaining a scanned image based on the closing signal, wherein the scanned image may be an image of a package affixed with the feedback information label captured by an inspection device; and S240, determining based on the scanned image that the package passes security inspection and sending package information corresponding to the feedback information label. The package delivery method provided by the embodiment of the present disclosure may effectively improve package delivery efficiency of the user and the security of the package, and may also effectively avoid smuggling or exchanging of the packages during the delivery.

In an embodiment of the present disclosure, when a user sends a package, a sending signal may be received by the human-machine interactive device 1. The human-machine interactive device 1 may output a feedback information label according to the sending signal and control a sending window 21 to open. The user may place the package 5 into the self-service express cabinet through the sending window 21. The user may manually close the sending window 21, or the human-machine interaction device 1 may control the sending window 21 to automatically close. After the sending window 21 is closed, the human-machine interaction device 1 may control the inspection device 3 based on the closing signal to perform a security inspection on the package 5. Specifically, the inspection device 3 may generate a scanned image via the ray component 32 and the detector component, and send the scanned image to the human-machine interaction device 1, wherein the scanned image may be an image of the package 5 affixed with the feedback information label captured by the inspection device 3. Determining based on the scanned image that the package 5 passes the security inspection, the human-machine interaction device 1 may send package information corresponding to the feedback information label.

Further, determining based on the scanned image that the package 5 passes the security inspection may include: sending the scanned image to a personnel at a judgment terminal, so that the personnel at the judgment terminal may determine based on the scanned image that the package 5 passes the security inspection; and/or determining based on the scanned image and a pre-stored judgment model that the package 5 passes the security inspection.

Specifically, by sending the scanned image to the personnel at the judgment terminal to determine whether or not the package 5 has passed the security inspection, the personnel at the judgment terminal may perform the security inspection on the package 5 by checking whether or not the scanned image contains information about dangerous items or explosive items. In the step of determining based on the scanned image that the package 5 passes the security inspection, the human-machine interactive device 1 may also determine based on the scanned image and a pre-stored judgment model that the package passes the security inspection, which is called artificial intelligence (AI) judgment, wherein the judgment model may be a mathematical model or algorithm of the dangerous items or explosive items. It can be understood that the judgment model in the embodiment of the present disclosure may be a commonly used security inspection judgment model in the field, and will not be described in detail.

In an optional embodiment, determining based on the scanned image that the package 5 passes the security inspection may include both the remote judgment by the personnel at the judgment terminal and the artificial intelligence judgment. If the package 5 passes through both the remote judgment of the personnel at the judgment terminal and the artificial intelligence judgment, it can be determined that the package 5 passes the security inspection; and if the remote judgment of the personnel at the judgment terminal is inconsistent with the artificial intelligence judgment, the security inspection of the package 5 should be re-performed, that is, an updated scanned image component may be generated by the ray component 32 and the detector component, or the personnel at the judgment terminal or the human-machine interaction device 1 may be changed.

According to an embodiment of the present disclosure, the package delivery method 200 for the self-service express cabinet may further include controlling the inspection device 3 to convey the package 5 to an abnormal package window if it is determined based on the scanned image that the package fails to pass the security inspection.

When the user uses the self-service express cabinet in the embodiment of the present disclosure to send a package, the package should be a security check on the package 5. Specifically, the package delivery method provided by the embodiment of the present disclosure includes the following steps.

In step 1, item information and weight information of the package may be obtained via the inspection device.

In step 2, the human-machine interaction device may determine based on the item information whether the package passes the security inspection of the inspection device. If the determination is yes, step 3 may be performed; if the determination is no, step 4 may be performed.

In step 3, according to the weight information and the item information of the package, the human-machine interactive device 1 may generate feedback information for a charge of the package.

In step 4, the package may be conveyed to the abnormal package window.

In step 5, for the package that has passed the security check, the human-machine interactive device may determine whether the corresponding charge of the package is payed within a predetermined time. If the determination is yes, step 6 may be performed; if the determination is no, step 7 may be performed.

In step 6, the inspection device may convey the package to the storage component of the package conveying device.

In step 7, the human-machine interaction device may generate the feedback information of payment failure.

In step 7 above, the user may continue to make payment according to the feedback information of the payment failure provided by the human-machine interactive device. If the payment is not successful for a long time, the human-machine interactive device will convey the package to the abnormal package window. When the package is sent by the above package delivery method, security inspection and quality inspection may be performed on each package, which may effectively improve the accuracy and security of the self-service express cabinet and effectively avoid abnormal or dangerous packages.

As described above, the embodiments of the present disclosure provide a self-service express cabinet and a package delivery method, such that concentrating a large number of packages at a large security center to perform security inspection may be avoided, and efficiency of the security inspection may be improved. The self-service express cabinet of the present disclosure may have an inspection device disposed in the cabinet body, and therefore the self-service express cabinet may automatically deliver packages and perform security inspection on the packages. Accordingly, the security inspection on the large number of packages at the large security center may be diverted, and package delivery efficiency may be improved. Further, a receiving end and an output end of the inspection device may correspond to a sending window and a storage component respectively. The packages passed through the inspection device after the security inspection may be conveyed directly into the storage component, so as to prevent a user from exchanging and smuggling the packages which have passed the security inspection, which effectively guarantees the security of the packages.

It should be understood that the terms such as "first", "second", etc. are only used to distinguish one entity or operation from another entity or operation, and do not necessarily require or imply that there is any such actual relationship or order between these entities or operations. It should be understood that the terms are interchangeable under appropriate circumstances so that the embodiments of the disclosure described herein can, for example, work or be arranged in a sequence other than those illustrated or otherwise described herein.

The present disclosure may be implemented in other specific forms, without departing from the spirit and essential characteristics thereof. Therefore, the preset embodiments are considered as illustrative and non-limiting in all respects. The scope of the present disclosure is defined by the appended claims rather than the above descriptions, and all changes falling within the meanings and equivalents of the claims are thus included in the scope of the present disclosure. Moreover, different technical features in different embodiments may be combined to achieve beneficial effects. Those skilled in the art may be able to understand and achieve embodiments of other changes of the disclosed embodiments on a basis of a study of the accompanying drawings, specification, and claims.

What is claimed is:

1. An apparatus, comprising:
   a cabinet body comprising a sending window and a chamber, wherein the sending window is connected with the chamber, and the sending window is disposed on a surface of the cabinet body;
   a human-machine interaction device disposed on the cabinet body for information interaction with a user;
   an inspection device disposed in the chamber and configured to perform a security inspection on a package dropped into the chamber for delivery for dangerous or explosive items, wherein the inspection device has a receiving end and an output end, and at least part of the receiving end is located within a scope of a forward projection of the sending window, wherein the security inspection includes generating a scanned image of the package;
   at least one storage component disposed in the chamber and corresponding to the output end to receive the package passing through the inspection device;
   a package conveying device configured to convey the package from the sending window to the receiving end of the inspection device, from the receiving end to the output end of the inspection device and from the output end to one of the at least one storage component; and
   a processor and a memory configured to cause the processor to execute a method comprising:
   sending the scanned image to a remote judgment terminal;
   receiving confirmation from the judgment terminal that the package has passed security inspection; and
   accepting the package;
   wherein the security inspection is performed by an artificial intelligence locally and at the judgment terminal;
   wherein the security inspection is repeated if the local judgment performed by the artificial intelligence and the judgment performed at the judgment terminal are inconsistent.

2. The apparatus according to claim 1, wherein the inspection device comprises a conveying component, a ray component, a detector component, and a weighing component, the conveying component extends from the sending window in a direction towards the storage component, the ray component and the detector component are used to perform security inspection on the package, and the weighing component is disposed at a bottom of the package conveying device and used to detect a weight of the package.

3. The apparatus according to claim 1, further comprising multiple storage components
   wherein a collecting window is further disposed on the surface of the cabinet body, and a forward projection of the collecting window is located within a scope of the movement trajectory of the package.

4. The apparatus according to claim 3, wherein the package conveying device comprises a conveying track and a bracket, the multiple storage components are disposed on the bracket, and the bracket is disposed on the conveying track and drives the storage components to move along the conveying track;
   wherein the conveying track is a revolving track.

5. The apparatus according to claim 3, wherein the package conveying device comprises a foldable bracket, the foldable bracket comprises multiple telescopic units, the storage components are telescopic storage components, each of the telescopic units is disposed with at least one storage component, and the storage components perform synchronous telescopic movement with the telescopic units.

6. The apparatus according to claim 3, wherein the multiple storage components are storage brackets reciprocating along a first direction, and the multiple storage components are sequentially disposed on the package conveying device along the first direction;
   wherein the multiple storage components are arranged at different intervals along the first direction.

7. The apparatus according to claim 4, further comprising a first abnormal package window and a first abnormal package channel, wherein:
   the first abnormal package window is disposed on the surface of the cabinet body, and a forward projection of the first abnormal package window is located within a scope of the first abnormal package channel;
   the first abnormal package channel extends from the receiving end toward a bottom of the cabinet body, and an abnormal package detected by the inspection device is moved to a region of the first abnormal package window through the first abnormal package channel.

8. The apparatus according to claim 5, further comprising a first abnormal package window and a first abnormal package channel, wherein:
   the first abnormal package window is disposed on the surface of the cabinet body, and a forward projection of the first abnormal package window is located within a scope of the first abnormal package channel;

the first abnormal package channel extends from the receiving end toward a bottom of the cabinet body, and an abnormal package detected by the inspection device is moved to a region of the first abnormal package window through the first abnormal package channel.

9. The apparatus according to claim 6, further comprising a first abnormal package window and a first abnormal package channel, wherein:
the first abnormal package window is disposed on the surface of the cabinet body, and a forward projection of the first abnormal package window is located within a scope of the first abnormal package channel;
the first abnormal package channel extends from the receiving end toward a bottom of the cabinet body, and an abnormal package detected by the inspection device is moved to a region of the first abnormal package window through the first abnormal package channel.

10. The apparatus according to claim 3, wherein a package conveying device comprises a lifting device, the lifting device is disposed between the inspection device and the storage components, the lifting device is configured to reciprocate in a first direction, and the multiple storage components are sequentially disposed on the package conveying device along the first direction;
wherein the surface of the cabinet body is further disposed with a second abnormal package window, and the lifting device is configured to convey an abnormal package to the second abnormal package window.

11. The apparatus according to claim 1, further comprising at least one temporary storage unit, and the temporary storage unit comprises multiple storage compartments for storing items.

12. The apparatus according to claim 1, wherein the cabinet body is further disposed with any one or combination of multiple package compartments, a lighting indication unit, a video monitor unit, a display unit, a lightning arrester, a signal antenna component, a packaging material storage unit, and a canopy.

13. A method, comprising:
receiving a sending signal;
outputting a feedback information label according to the sending signal, and controlling a sending window to open;
receiving a closing signal of the sending window;
scanning a package affixed with the feedback information label with a ray component to generate an image;
obtaining the scanned image based on the closing signal; and
determining based on the scanned image that the package passes security inspection and sending package information corresponding to the feedback information label;
wherein the determining includes:
sending the scanned image to a remote judgment terminal;
receiving confirmation from the judgment terminal that the package has passed security inspection; and
accepting the package;
wherein the security inspection is performed by an artificial intelligence locally and at the judgment terminal;
wherein the security inspection is repeated if the judgments of the artificial intelligence and at the judgment terminal are inconsistent.

14. The method according to claim 13, wherein the determining based on the scanned image that the package passes the security inspection comprises:
sending the scanned image to a personnel at a judgment terminal, so that the personnel at the judgment terminal determines based on the scanned image that the package passes the security inspection; and/or
determining based on the scanned image and a pre-stored judgment model that the package passes the security inspection.

15. The method according to claim 13, wherein the method further comprises:
conveying, with an inspection device, the package to an abnormal package window if it is determined based on the scanned image that the package fails to pass the security inspection.

16. The apparatus of claim 1, wherein the artificial intelligence is a mathematical model of dangerous and explosive items.

17. The apparatus according to claim 1, further comprising an artificial intelligence and wherein the security inspection includes scanning the package and the security inspection is performed by the artificial intelligence.

* * * * *